United States Patent
Filmer et al.

(10) Patent No.: US 9,968,945 B1
(45) Date of Patent: May 15, 2018

(54) MAXIMISE THE VALUE OF A SULPHIDE ORE RESOURCE THROUGH SEQUENTIAL WASTE REJECTION

(71) Applicant: Anglo American Services (UK) Ltd., London (GB)

(72) Inventors: Anthony Owen Filmer, Kangaroo Point (AU); Daniel John Alexander, London (GB)

(73) Assignee: ANGLO AMERICAN SERVICES (UK) LTD., London (GB)

( * ) Notice: Subject to any disclaimer, the term of this patent is extended or adjusted under 35 U.S.C. 154(b) by 0 days. days.

(21) Appl. No.: 15/631,137

(22) Filed: Jun. 23, 2017

(51) Int. Cl.
| | |
|---|---|
| B02C 23/14 | (2006.01) |
| B03D 1/02 | (2006.01) |
| B03D 1/002 | (2006.01) |
| B03D 1/08 | (2006.01) |
| B03D 1/012 | (2006.01) |
| B03D 1/12 | (2006.01) |
| B03D 1/14 | (2006.01) |
| B02C 23/10 | (2006.01) |

(52) U.S. Cl.
CPC ............. *B03D 1/002* (2013.01); *B02C 23/10* (2013.01); *B02C 23/14* (2013.01); *B03D 1/012* (2013.01); *B03D 1/087* (2013.01); *B03D 1/12* (2013.01); *B03D 1/14* (2013.01); *B03D 1/02* (2013.01); *B03D 2203/02* (2013.01)

(58) Field of Classification Search
CPC ........ B03D 1/002; B03D 1/087; B03D 1/012; B03D 1/12; B03D 1/14; B03D 2203/02; B03D 1/02; B03D 1/06; B02C 23/10; B02C 23/14

See application file for complete search history.

(56) References Cited

U.S. PATENT DOCUMENTS

| | | | | |
|---|---|---|---|---|
| 5,078,860 A * | 1/1992 | Ray | ........................ | B03D 1/014 209/167 |
| 5,171,428 A * | 12/1992 | Beattie | .................... | B03D 1/002 209/166 |
| 8,753,593 B2 * | 6/2014 | Senior | ....................... | B03D 1/02 209/162 |

* cited by examiner

*Primary Examiner* — Thomas M Lithgow
(74) *Attorney, Agent, or Firm* — Nixon Peabody LLP; Jeffrey L. Costellia (57) ABSTRACT

This invention relates to an integrated process for recovering value metals from sulphide ore which includes the steps of bulk sorting 16 and screening 24/28 crushed ore. The sorted/screened coarse ore stream is ground and classified 20 to provide a coarse fraction 34 suitable for coarse flotation and a first fine fraction 38 suitable for flotation. The coarse fraction suitable for coarse flotation is subjected to coarse flotation 36 thereby to obtain a gangue 42 and an intermediate concentrate 46. The intermediate concentrate is subjected to grinding 48 to provide a second fine fraction suitable for conventional flotation. The first fine fraction and the second fine fraction are subjected to conventional flotation 40 to provide a concentrate and tailings. This process that capitalizes on the natural heterogeneity of sulphide orebodies, and utilizes bulk sorting, screening and coarse flotation beneficiation technologies in a novel multistage configuration to reject the maximum quantity of waste gangue prior to fine comminution.

21 Claims, 5 Drawing Sheets

MAXIMISE THE VALUE OF A SULPHIDE ORE RESOURCE THROUGH SEQUENTIAL WASTE REJECTION

BACKGROUND TO THE INVENTION

Sulphide ores containing metals such as copper, gold, platinum group metals, nickel, lead and zinc are recovered commercially by fine grinding and flotation to concentrate the valuable component and discard the gangue.

The conventional process involves grade control drilling to delineate the ore, blasting the necessary waste (below economic cut-off-grade (CoG)) and ore, loading trucks to haul the ore for primary crushing and the waste to a disposal area. The crushed ore is conveyed to a milling process, typically using semi-autogenous grinding (SAG) or high pressure grinding rolls (HPGR); followed by ball milling to fully liberate the valuable particles at a p80 of around 75-200 micron. Then the ore is separated using a flotation process to produce a saleable concentrate and tailings. The tailings from flotation are pumped to a tailings storage facility (TSF) and stored in perpetuity.

As the conventional process chain requires all of the ore to be ground finely, it consumes large quantities of energy (typically 20 kwh/t ore) and water (0.5-1.0 tonne water per tonne of ore). The majority of this water is lost in the fine tailings, where it is intimately mixed and retained with the very fine residue produced from the conventional flotation process.

The shortage of available water in some locations has generated different approaches to water saving. Some mines have installed desalination plants on the adjacent coast, and pumped the desalinated water to the processing facility. Others have installed large filter presses to squeeze as much water from tailings as possible. However these solutions both suffer very high capital and operating costs. The high cost of fine grinding and high water consumption also means the recovery efficiency of the in-ground resource is limited to that which is economic to process.

At any particular time in the mine life, the CoG for ore is set to maximise the feed grade and hence production from the available processing capacity. This CoG may be variously constrained by available water, or tailings capacity, or the installed processing capacity. Whichever constraint applies, economically attractive ore is often being rejected to a waste pile, simply because higher grade materials are available at the time. Even if a low grade stockpile is introduced to manage the material which is above economic processing grade but below the CoG of the day, the materials handling cost of stockpiling and reclaiming this marginally attractive material later in the mine life, implies a fraction of the economic resource will be lost to the waste rock pile.

If the run-of-mine ore could be beneficiated prior to fine grinding, to reject as waste material which is below economic cut-off-grade, with a high recovery of the values and a reasonably high upgrade ratio, and in a relatively low cost operation, the unit costs and consumption of water would be reduced. The consequential grade of feed to processing would be increased. And the grade of any stockpile required by a constraint to available processing capacity would be higher, resulting in improved margins when eventually recovered.

Recognising the value associated with removing a fraction of the ore that is below CoG, and preferably below economic treatment grade, various beneficiation techniques have been proposed. For sulphides, these are usually based around gravity techniques such as dense media separation, spirals, etc., and rock sorting methods. But for most sulphide ores, these beneficiation techniques fail either the upgrade ratio/recovery or cost hurdles for implementation.

If the beneficiation parameters are set to reject sufficient ore (i.e. achieve a high upgrade ratio) to economically warrant the cost of the beneficiation process, the loss of values is excessive. This means an increase in mining cost per tonne of product, and a decrease in the effective utilisation of the overall resource.

Hence run of mine (RoM) ores are conventionally ground to very fine sizes to achieve complete liberation of the valuable components then floated, despite the obviously high cost of comminution and water consumption.

Recently, the ability to use a chemically based coarse flotation process for beneficiating sulphides, using a fit for purpose flotation cell has been proposed by Eriez Flotation Division (EFD), a wholly owned subsidiary of Eriez Manufacturing Co. Using this coarse flotation technology, the ability to dry stack sand residue was recognised, thus opening up another potential beneficiation technique to reduce water and energy (WO2016/170437). As a one off process for water recovery, it is very useful, but due to particle size vs. recovery constraints on coarse flotation, and the size separation precision of hydrocyclones, only 30-50% of the ore ends up as sand. Hence water consumptions and tailings volumes are typically only reduced by some 25-40%.

In a second beneficiation technique for sulphidic ores, the differential fracture along the mineralised grain boundaries, causing most of the sulphides to concentrate in the finer size ranges, has been recognised. The differential fracture enables screening to reject the coarsest rocks, which usually contain the lowest grade. This technique was first introduced in Bougainville in the late 1980s (Australasian Institute of Mining and Metallurgy, Papua New Guinea Mineral Development Symposium, 27-28 Jun. 1986, Madang, The Application or Preconcentration by Screening at Bougainville Copper Limited, Burns R S and Grimes A W, the content of which is incorporated herein by reference). The beneficiation technique is being actively re-examined by a number of operations under the CRC Ore trademark of 'Grade Engineering'. CRC ORE is a not for profit organisation funded by the Australian Federal Government and the global minerals industry http://www.crcore.org.au/main/index.php/solutions/grade-engineering.

And finally, beneficiating using bulk sorting has also been proposed. The development of sensors that can adequately determine average grades on a conveyor belt or shovel at a high rate, allows for the stream of broken rock to be identified and diverted to either ore or waste. Reference: Valery et. al. World Mining Congress 2016; Minesense http://www.minesense.com/products:

The ShovelSense™ shovel product is a real-time mineral telemetry and decision support system for surface or underground applications. It is a retrofit package installed in the dipper of surface shovels or into the scoop of underground machines such as scooptrams or LHD's. The ShovelSense™ platform is used for:

Measurement of ore quality while material is being scooped into the dipper;

Reporting of ore quality and type to the grade control/ore routing system

Real-time, online decision support for ore/waste dispatch decisions.

Bulk sorting takes advantage of the natural heterogeneity of orebodies, with the separation of zones of high and low grade material that would conventionally be mixed into homogenised run-of-mine ore. The weakness of bulk sorting is it can only reject those zones that are low grade at the time of sensing, and hence to retain an acceptable upgrade ratio it must be installed prior to significant homogenisation of the ore.

Despite these three recent and quite distinct beneficiation techniques being relatively well known, none has yet found widespread use in the mining industry. This may be at least partially attributed to the same upgrade ratio, recovery, and cost reasons that have hampered the implementation of traditional gravity based beneficiation.

In summary, the mining industry is very capital intensive, a large consumer of water and energy, and only partially recovers the values contained in the earth that is mined. Whilst beneficiation techniques are known which can potentially address these issues, they have been considered in isolation to resolve each constraint individually, and mostly found to be uneconomic.

SUMMARY OF THE INVENTION

According to the present invention there is provided an integrated process for recovering value metals from sulphide ore, including the steps of:
a) obtaining a crushed ore;
b) bulk sorting and screening the crushed ore to provide a sorted/screened coarse ore stream and a waste ore stream;
c) subjecting the sorted/screened coarse ore stream to grinding in a mill followed by classification to provide a coarse fraction suitable for coarse flotation and a first fine fraction suitable for conventional flotation;
d) subjecting the coarse fraction suitable for coarse flotation to coarse flotation thereby to obtain a gangue and an intermediate concentrate;
e) subjecting the intermediate concentrate to grinding to provide a second fine fraction suitable for conventional flotation; and
f) subjecting the first fine fraction and the second fine fraction to conventional flotation to provide a concentrate and tailings.

Preferably, blending of the crushed ore is limited, for example to a truck load or shovel load, in order to limit homogenisation of the ore prior to step b).

At step a), the ore is preferably crushed to a size suitable for presentation on a conveyor, as a feed to a subsequent grinding stage, and is typically in the range of 5 to 40 cm.

The bulk sorting in step b) may be on a bulk sorter comprising a conveyor belt with a diverter mechanism controlled by a continuous analysis sensor, wherein the diverter mechanism diverts low grade zones of rock which do not meet a selected cut off grade (CoG) to the waste stream. The continuous analysis sensor preferably comprises a rapid scanning sensor, preferably a magnetic resonance or neutron activation or X-ray sensor.

In step b), the crushed ore may be subjected to bulk sorting followed by screening or screening followed by bulk sorting.

Preferably, at step b), the crushed ore is subjected to bulk sorting to provide a sorted coarse ore stream which is subjected in to grinding in step c), and a first waste ore stream.

Advantageously, the sorted coarse ore stream is screened to provide a screened coarse ore stream which is subjected to grinding in step c), and a second waste ore stream.

Typically, the size of screen apertures of a screen used to screen the coarse ore stream are selected to provide a screened coarse ore stream that is about 80-90% by weight of the coarse ore stream from bulk sorting.

Preferably, at step b), the first waste stream is screened to provide a third waste ore stream and a higher grade fraction that is sent for grinding in the grinder at step c) together with the sorted/screened ore stream.

Typically, the size of screen apertures of a screen used to screen the first waste ore stream are selected to recover from 15-25% by weight of the stream.

At step c), the ore is preferably ground in closed loop with a classification circuit, to allow scalping of material that is already reduced to the appropriate size ranges for coarse and conventional flotation.

At step c), the ore is preferably subjected to classification to provide a coarse fraction suitable for coarse flotation with a size of 100 μm up to 1000 μm, preferably 150 μm up to 800 μm, most preferably from 200 μm up to 600 μm, and a first fine fraction suitable for conventional flotation with a size of less than 100 μm, typically less than 150 μm, preferably less than 200 μm.

At step e), the intermediate concentrate is preferably ground to a size of less than 150 μm to provide a second fine fraction suitable for conventional flotation.

Preferably, a natural grade recovery curves is determined for the ore, and each of the following beneficiation steps:
i) bulk sorting;
ii) screening;
iii) coarse flotation;
is arranged and controlled to permanently reject the maximum quantity of waste at a grade less than an economic cut-off-grade.

The beneficiation steps:
i) bulk sorting;
ii) screening;
iii) coarse flotation;
may be further arranged and controlled to also separate a low grade ore suitable for stockpiling or heap leaching, and hence produce a high grade feed to fill the available comminution and conventional flotation capacity.

For the constraints of a particular mining asset, the design and set points are further selected for each beneficiation step, to:
optimise the production of the whole mining and processing asset system, within the constraints of water or tailings storage capacity; and/or
optimise the capital costs of productive assets and infrastructure in a new or expanded mine; and/or
optimise the recovery of mineral values from an orebody; and/or
optimise the overall operating costs per tonne of product by ultimately rejecting the maximum waste, at less than the economic cut-off grade (CoG) for retreatment.

Preferably, homogenisation is minimised prior to bulk sorting to maximise the removal of gangue.

Screening may be used specifically to scavenge the higher grade fines from the reject stream of bulk sorting Screening may also be used specifically to scavenge the lower grade coarse material from the ore product stream of bulk sorting.

DESCRIPTION OF PREFERRED EMBODIMENTS

The present invention relates to a process that capitalises on the natural heterogeneity of sulphide orebodies, and utilises beneficiation technologies in a novel multistage configuration to reject the maximum quantity of waste gangue prior to fine comminution. This rejected gangue is normally below economic reprocessing grade (i.e. waste) but might also be in the form of a feed to heap leach; or in the form of a low grade stockpile for treatment later in the mine life (grade profiling).

The exact quantum of benefits will be dependent on the grade recovery characteristics of a particular orebody. However, using combination of the techniques, the water and comminution energy consumption are typically reduced by 50-80% at the same mining cut-off-grade (CoG). Alternatively, the mining cut-off-grade can be reduced, extending the life of mine, and achieve only slightly lower reductions in overall water and energy consumption. The invention also enables unit costs of production, capital and operating, to be significantly reduced, and where appropriate the profile of production to be brought forward to enhance the return on invested capital.

Figure 1:
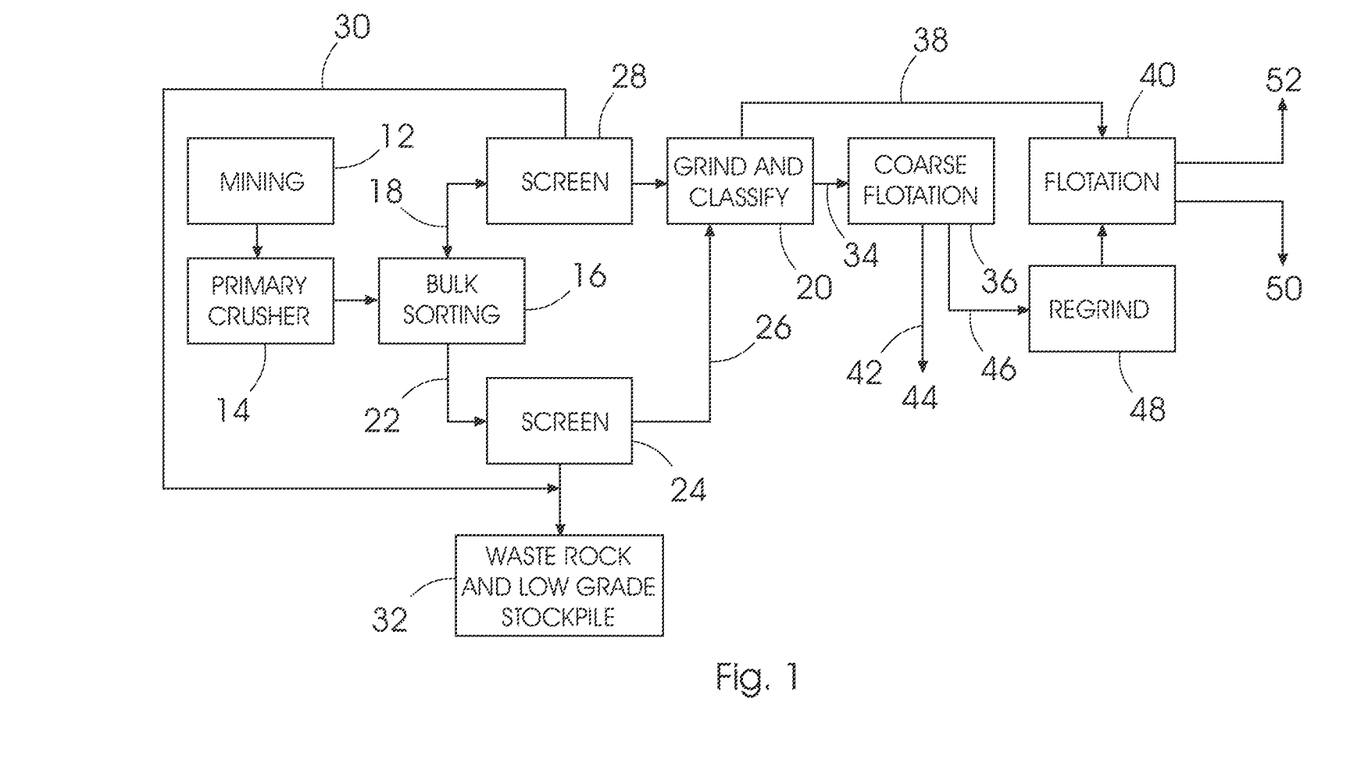
FIG. 1 is a flow diagram of a beneficiation process according to an embodiment of the invention.

A simplified block flowsheet of one embodiment of the invention is shown in FIG. 1. An orebody is mined 12 and fed to a primary crusher 14, from where it is bulk sorted 16 to provide a sorted coarse ore stream 18 for grinding and classifying 20 and a sorted waste stream 22. A screen 24 recovers a high grade finer fraction 26 from the sorted waste stream 22, and this rejoins the high grade stream for grinding and classifying 20. If the sorted coarse ore stream 18 from bulk sorting 16 is sufficiently low grade, it can be similarly screened 28 to reject the coarsest material 30 to the waste or low grade stockpile 32. Classification splits the ore after partial grinding into a coarse product stream 34 suitable for coarse flotation 36 and a fine product stream 38 suited to proceed direct to flotation 40. The coarse flotation process 36 then rejects further gangue 42 to a sand stockpile 44, with an intermediate concentrate 46 being reground 48 to proceed to conventional flotation 40. A concentrate 50 and tailings 52 are obtained from the conventional flotation 40.

Thus, low grade material 32 and 44 is rejected from the sorter/screen combination 16/24/28, and from the coarse flotation 36, thus requiring only a proportion of the original ore to be finely ground to achieve the full liberation required to produce a saleable concentrate.

The variable nature of ore mineralogy and/or mine designs, means that deportment of the values will be different at each mine. For example at occasional mines, it may be possible to reverse the screening and bulk sorting, whilst still retaining the natural ore heterogeneity. In this variant, the fine material from screening would proceed to grinding, and the coarse fraction would be bulk sorted to reject waste. The system design would be such as to minimise homogenisation during sorting.

And for some mines with particularly attractive grade recovery curves for one or two of the beneficiation techniques, it may be economically more appropriate to utilise only some of the components of the multi-stage novel processing chain that is the subject of this invention.

The grade recovery curve for bulk sorting is well suited to waste removal, providing the natural spatial heterogeneity of the orebody is retained. Screening is well suited to scavenging values (the fines) from low grade streams, but only for occasional orebodies does the selective fracture enable high recoveries and immediate rejection of waste. Coarse flotation is well suited to rejection of waste with a high recovery, albeit after partial comminution.

First Component—Bulk Sorting

The first component beneficiation step in the most common configuration of this invention, is bulk sorting. Ore that has been fragmented by blasting, is transported by truck or conveyor to a primary crusher, and by conveyor to grinding. On the conveyor either before or after the primary crusher, the grade of the ore (or deleterious contaminants) can be analysed, using techniques such as magnetic resonance, for example an on-conveyor MR Analyser for a species other than chalcopyrite being developed by CSIRO in collaboration with CRCOre, which will result in the on-conveyor MR technology attaining a TRL 4 for detection of selected non-chalcopynte mineral targets http://www.crcore.org.au/main/images/snapshot/projects/CRC-ORE-Snapshot--Research-1.003--Bulk-sensing-with-magnetic-resonance.pdf; or neutron activation, for example a cross belt analyser available from SODERN which makes use of a CNA (Controlled Neutron Analyser) using an electrical neutron source with stabilised emission http://www.sodern.com/sites/en/ref/Cross-belt-Analser_71.html, allowing a decision to divert the stream of rock to ore or to waste. NA is a nuclear process used for determining the concentrations of elements in a vast amount of materials. CNA allows discrete sampling of elements as it disregards the chemical form of a sample, and focuses solely on its nucleus.

By minimising homogenisation wherever possible in the materials handling, the high and low grade zones of ore are retained almost intact. This point of analysis for bulk sorting may be before or after the primary crushing depending on the nature of fragmentation in blasting. But the bulk sorting must be located prior to a SAG or ball mill where blending and recirculating loads eliminate the heterogeneity. Any intermediate stockpiles between the mine and the bulk sorter should also be avoided.

These zones of high and low grade rock, when loaded on the conveyor belt, translate into corresponding lengths. Some sections along the length of the loaded conveyor belt are below the economic processing cut-off-grade, while others are made up from the high grade zones. Based on the continuous sensor analysis, a diverter mechanism is used to divert those low grade lengths of rock, which do not meet the desired CoG, to a separate waste stream.

The typical grade tonnage curve for bulk sorting will be very dependent on the orebody heterogeneity. Through retaining this natural zonal heterogeneity and using a rapid scanning sensor, the effective sorting lot size is considerably smaller than the typical 20-25 m grid used for conventional in-pit grade control. (In conventional grade control, everything in this grid being averaged and declared as either ore or waste). Thus, the bulk sorting process discriminates more accurately between waste and ore than conventional grade control.

Figure 2:
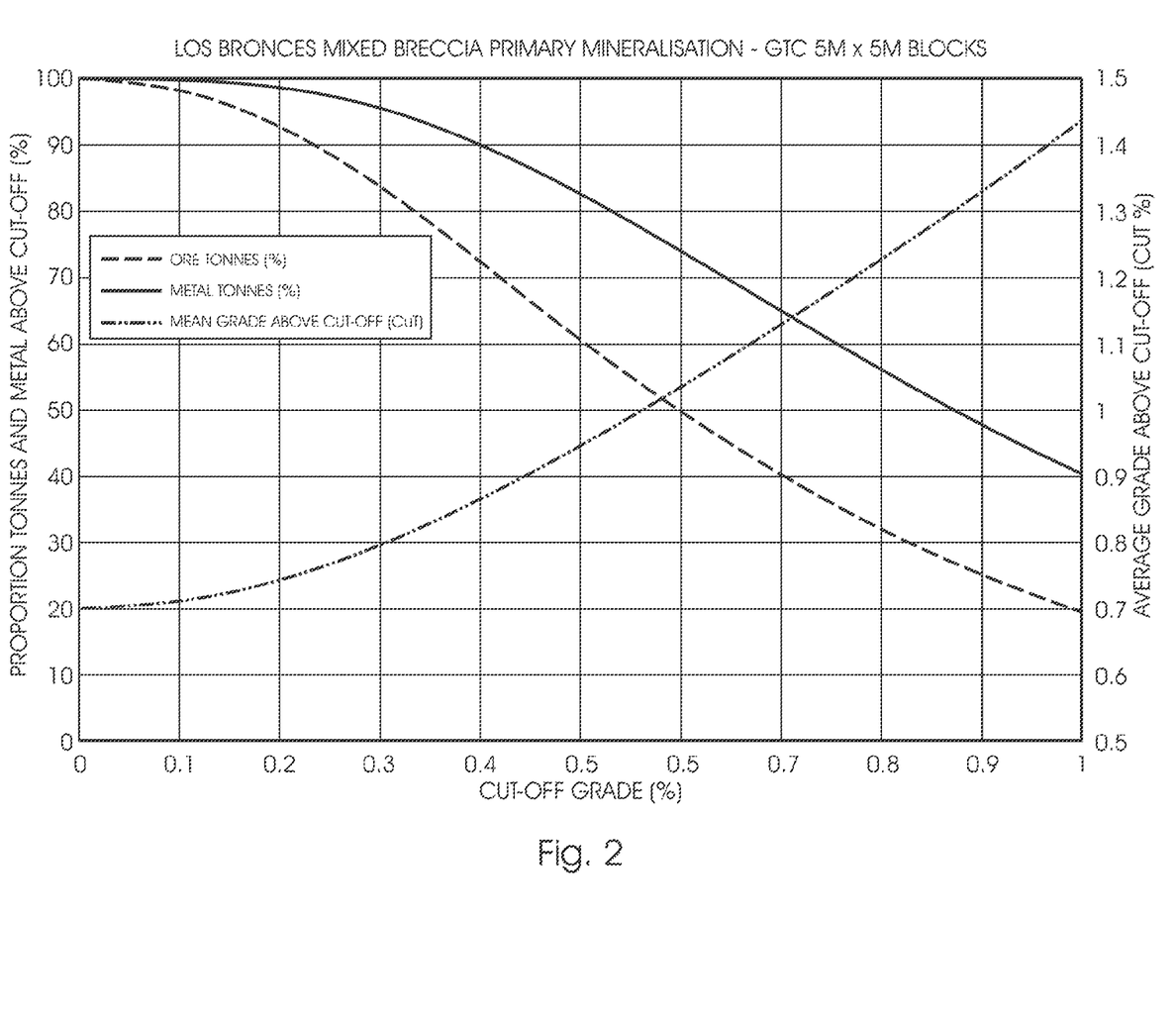
FIG. 2 is a graph showing a grade tonnage curve for bulk sorting of a typical copper porphyry ore.

The quantity of rock that is below cut-off-grade, and hence can be removed from conventional ore can be estimated from geo-statistical analysis of drill core. Assuming the rock is homogenised at the granularity of a 300 t truck delivered to the conveyor, a grade tonnage curve is illustrated in FIG. 2, for a typical copper orebody in Chile, illustrates that up to 25% of the run-of-mine ore can be rejected as waste.

An even more amenable Platreef pgm ore from South Africa can yield up to 40% waste rejection at below the processing CoG. Similarly, a reasonably homogeneous porphyry copper RoM from Peru, can yield up to 20% waste at below the 0.25% CoG.

Optionally, the process can be configured such that one stream from the first diverter can be further sorted, using a second diverter system. This technique can be used to create three fractions (high grade stream for immediate processing: and lower grade stream of ore to be stockpiled, or heap leached: and a waste stream). This grade profiling technique is ideally suited where mining costs are modest relative to processing, and the orebody is large enough to warrant retreating of the lower grade fraction at some later date. If water is highly constrained, this enables high production in early years (grade profiling) within an available water constraint.

Minimising the level of blending that occurs prior to this bulk sorting sensor and diverter is important to maximise the rejection of low grade ore. The partially blended lot size (e.g. a truckload) that can be analysed and diverted is smaller than that achievable with the spacing of normal grade control drilling. Due to natural orebody heterogeneity, a significant proportion of the conventional RoM feed is below the mine CoG, and can be diverted to waste or assigned to a low grade stockpile.

This early rejection of a waste stream that would otherwise be processed as ore, has implications for both resource utilisation and costs. The waste is no longer ground (energy savings) and is stored dry (water savings). The separation efficiency of bulk sensing is better than grade control drilling and selective loading, so that this grade control activity can be limited to delineating the ultimate pit shell, saving further costs and simplifying mining activities. The removal of waste means that unit costs of processing are reduced, and hence a lower CoG can be used for this ultimate pit shell. Thus the overall utilisation of the resource endowment can be improved.

Second Component—Screening

In the second component of the multiple beneficiation steps that make up this invention, one or both of the waste and ore streams from bulk sorting are screened. Sulphide ores selectively fracture along the mineralised grain boundaries during blasting and crushing. As such the finest fraction of the rocks in any ore zone will be of a higher grade.

Figure 3:
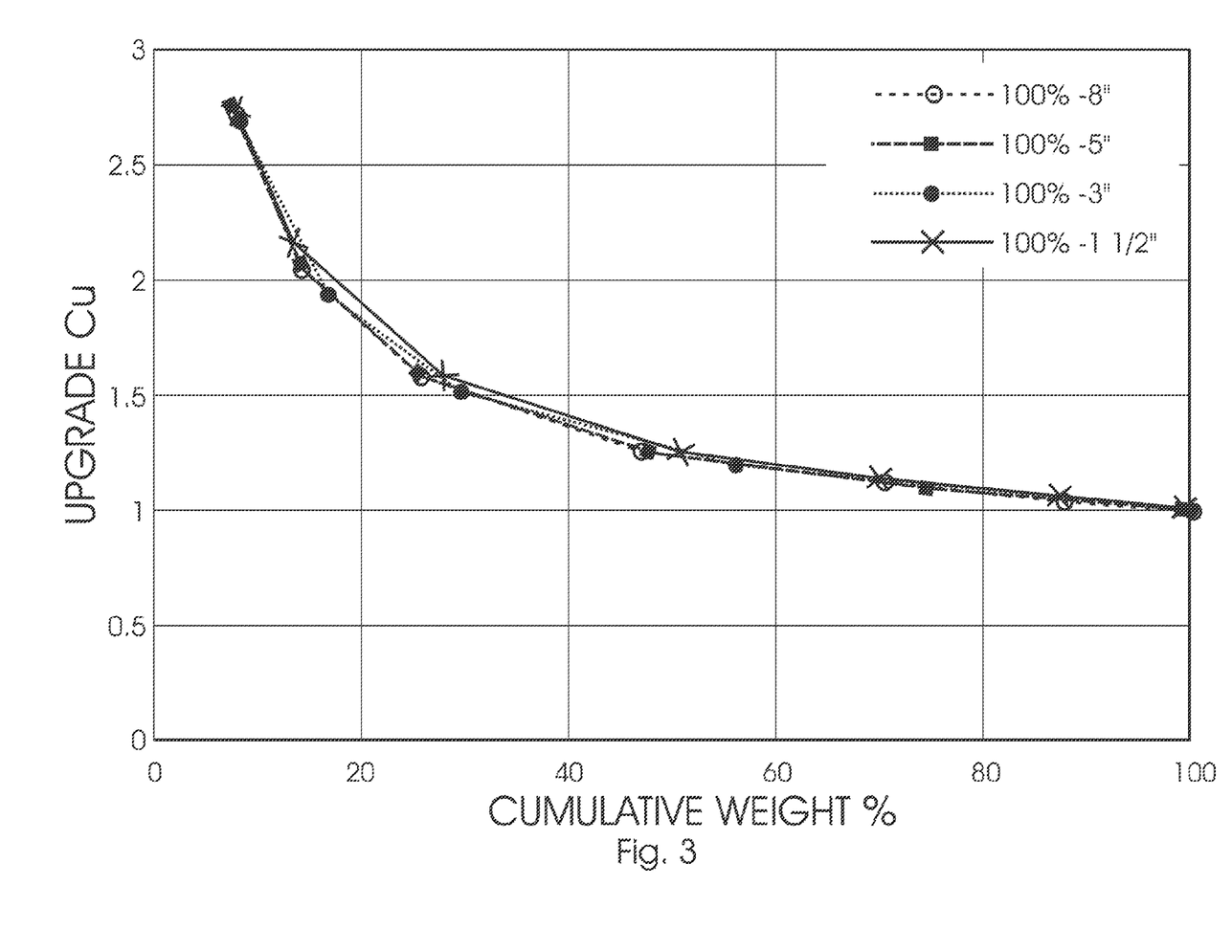
FIG. 3 is a graph of the upgrading achievable by screening at various proportions of a typical copper porphyry ore

If an ore exhibits a significant selectivity, the waste stream from the bulk sorting is screened to further separate the higher grade, finer fraction. These smaller rocks, are included in the ore stream. An example of this is shown in FIG. 3 for a reasonably selective Chilean copper ore, where the finest 10-20% of the ore, typically exhibits around twice the grade of the remaining 80-90% of the ore. Thus a screening process is used to scavenge those fines, which are higher than the processing cut-off-grade, from the reject stream from bulk sorting. As such, the grade of the waste discard stream is further reduced, thus improving overall resource recovery. Depending on the particular grade recovery curves for any ore, the set points for each beneficiation process can be selected to optimise the waste rejection by the overall bulk sorting/screening system.

Depending on the selectivity of fracture of the particular ore, this screening will typically require a screen aperture to recover around 15-25% by weight of the low grade stream. The coarse fraction proceeds to waste.

The high grade ore stream from primary crushing also contains a mix of rock sizes. Due to selective fracture that occurs in blasting, and any crushing undertaken prior to the bulk sorting, the highest grade is concentrated in the finer fraction of rock. Removal of the lower grade coarsest rocks by screening can result in further upgrading of the feed to comminution. Whilst it may be unusual for such coarse material in the reject stream to be below economic processing grade, this fraction may be well suited to heap leach or low grade stockpile.

If screening of the coarsest rocks is applicable, the high grade fines stream will typically be around 80-90% of the total feed from bulk sorting. However for those ores where selective fracture is not pronounced, this high grade screening will not produce a sufficient grade differential to warrant the lower grade coarse material being rejected, and hence the screening of the bulk sorted ore will simply not be implemented.

The combined system of bulk sorting and screening of the high and low grade streams will have different optimum set-points for each ore to be treated, and for the economic drivers of each mine. It is apparent to those skilled in the art, that the set-points of the system can readily be optimised to produce the maximum grade for comminution, while rejecting the maximum rock that is at or below the economic cut-off-grade for processing.

Third Component—Coarse Flotation

The third stage of the multistage beneficiation is coarse particle flotation. This process utilises the heterogeneity at the sand (sub 1 mm) size level, for a chemically assisted gravity separation. The partially ground ore is classified to produce a sand fraction, which is beneficiated using a fit for purpose flotation machine such as the Eriez™ Hydrofloat. The Eriez Hydrofloat™, carries out the concentration process based on a combination of fluidization and flotation using fluidization water which has been aerated with microbubbles of air. The flotation is carried out using a suitable activator and collector concentrations and residence time, for the particular mineral to be floated. At this size, the ore is sufficiently ground to liberate most of the gangue and expose but not necessarily fully liberate the valuable mineral grains. The coarse flotation recoveries of partially exposed mineralisation is high, and the residual gangue forms a sand which does not warrant further comminution and conventional flotation. The reject sand from coarse flotation can be stacked and drained to recover water.

The system used to select a suitably sized feed for coarse flotation utilises classification devices such as cyclones or hydraulic classifiers to scalp that fraction of the stream that is suited to conventional flotation. In a typical configuration for this third beneficiation component, the material at a size less than the upper size limit for coarse flotation is separated from the ball mill circulating load. This stream can then be further classified to separate the material that is already ground to below the lower bound for coarse flotation, and this finer fraction is sent directly to conventional flotation. This creates the feed to coarse flotation at a size in which the residue which is 'free draining'.

In the normal configuration, the coarse flotation size range will be bounded by the maximum size where the valuable minerals are sufficiently exposed to be floated, with sufficient recoveries such as to produce a sand residue suitable to discard. The minimum size is set by the particle size at which the coarse flotation machine can operate efficiently to produce a free draining sand for disposal. Depending on the mineralogy, the fracture characteristics of the ore, and the design of the classification circuit; this lower size range is typically around 100-200 microns, and the upper size is typically between 350 and 600 micron. Depending on the size range for coarse flotation, and the classification efficiency, this scalping captures for coarse flotation between 40-60% of the total feed to comminution, with the remainder reporting to conventional flotation.

In a conventional froth flotation process, particle sizes are typically less than 0.1 mm (100 μm). The ore particles is mixed with water to form a slurry and the desired mineral is rendered hydrophobic by the addition of a surfactant or collector chemical. The particular chemical depends on the nature of the mineral to be recovered. This slurry of hydrophobic particles and hydrophilic particles is then introduced to tanks known as flotation cells that are aerated to produce bubbles. The hydrophobic particles attach to the air bubbles, which rise to the surface, forming a froth. The froth is removed from the cell, producing a concentrate of the target mineral. Frothing agents, known as frothers, may be introduced to the slurry to promote the formation of a stable froth on top of the flotation cell. The minerals that do not float into the froth are referred to as the flotation tailings or flotation tails. These tailings may also be subjected to further stages of flotation to recover the valuable particles that did not float the first time. This is known as scavenging.

The undersize from the classification is ideally sized for conventional flotation, as it does not suffer significantly from the poor recoveries that most conventional flotation exhibits with particles above around 200 micron.

The oversize from the initial classification of the ball mill recirculating load (above the upper bound selected for coarse flotation) is recycled for further comminution. Due to the extended size range that is scalped, the comminution energy is significantly reduced.

The sand residue from coarse flotation has a low exposed sulphide content. It represents 70-80% of the scalped coarse flotation feed. It has a sufficiently high hydraulic conductivity and can be hydraulically stacked and drained to recover the water.

The intermediate concentrate produced by coarse flotation is the remaining 20-30% of the coarse flotation feed. This requires regrinding to fully liberate the minerals, prior to conventional flotation in either the rougher section of conventional flotation along with the fines fraction from the ball mill classification, or direct to the conventional cleaner cells.

In a variant to coarse flotation, the size fraction of the feed to coarse flotation can be widened at the upper end to say 0.8-1.5 mm. This variant of the invention is typically utilised when the throughput of the overall mine is constrained by the fine grinding, conventional flotation, or tailings storage process, including total available water to the mine. In this variant, a greater proportion of the ball mill recirculating load is scalped and beneficiated, albeit that the coarse fraction of the coarse flotation residue will not be of a grade that can be discarded directly. Some but not most of the coarsest feed material has exposed sulphide surfaces that will float. Thus the coarse fraction is partially denuded of its values, albeit not sufficiently to justify immediate assignment as waste. So the overall residue from coarse flotation, is further classified to separate the partially denuded coarse sand that is above the normally selected upper bound for optimum recovery in coarse flotation. This partially denuded coarse material can then be dry stacked for processing later in the mine life. In this variant the throughput capacity of the ball mills is further increased, and the consequential grade profiling enables higher production from conventional flotation early in the mine life.

Integration of the Beneficiation System

By configuring bulk sorting and screening and coarse flotation, the benefits of zones of high and low grade ores, and the differential deportment of mineral values during fragmentation, and the selective liberation and separation of gangue, are synergistic. Bulk sorting utilises the natural heterogeneity at the ore zone level. Screening captures the natural heterogeneity at the individual rock level. And coarse flotation captures the heterogeneity at the sand level. The sequential steps are also compensatory, in that there can be a second, modest cost, backstop to avoid permanent disposal of values that may have found their way into the wrong stream in a prior beneficiation step, and reject gangue which has been misplaced into the values stream.

Whilst the multi-stage beneficiation process may be configured in various ways, the most economic decision for a long life mine is usually to maximise production from existing assets. The decision tree illustrated for this case in FIG. 4, is an example of the design principles that can be applied, and the associated rational for selection of setpoints.

Figure 4:
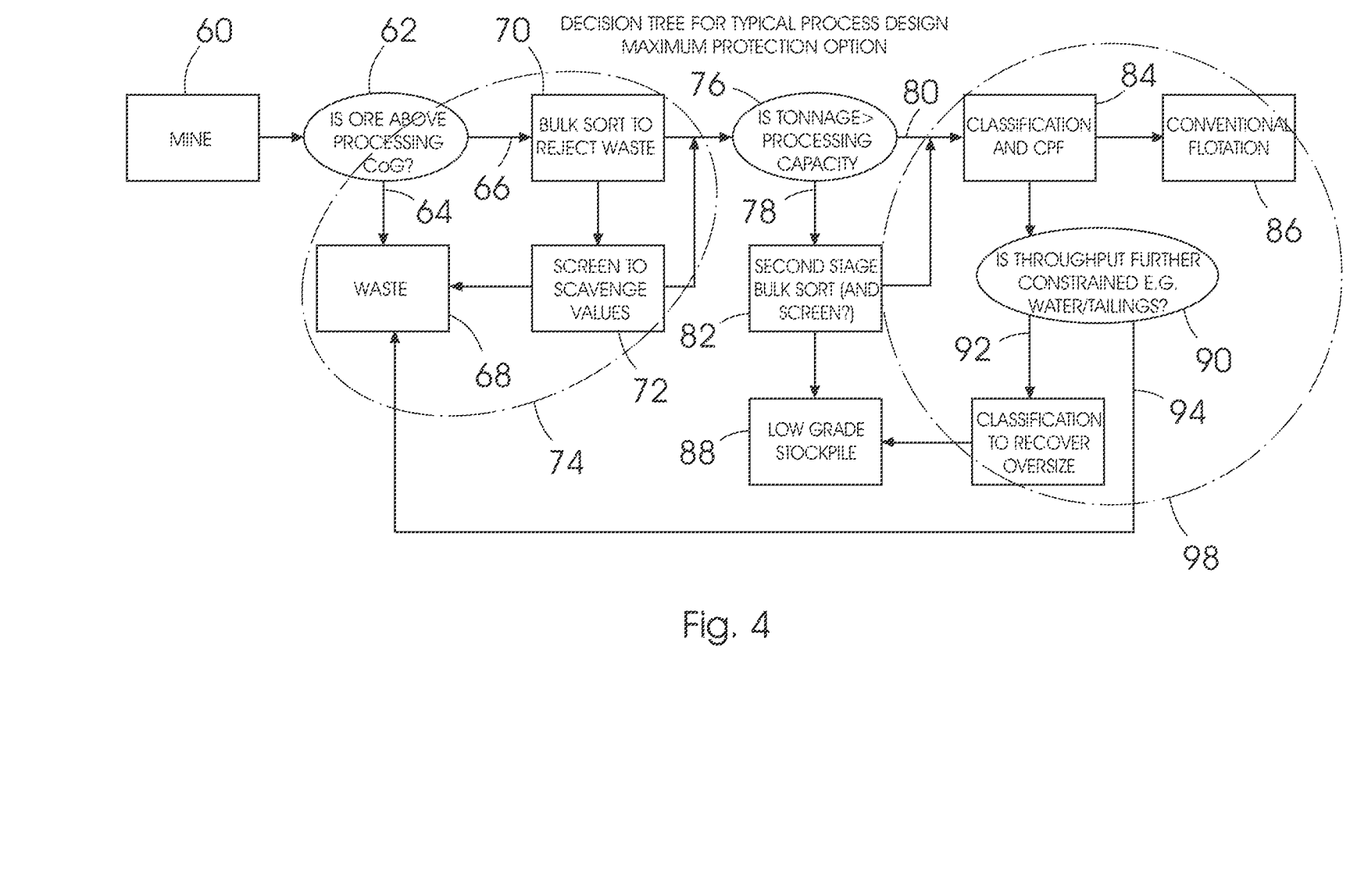
FIG. 4 is a decision tree for a typical process design for an embodiment of the invention.

In FIG. 4, the reference numerals indicate: 60 mine, 62 Is the Ore above Processing CoG?, 64 No, 66 Yes, 68 Waste, 70 Bulk Sort to reject waste, 72 Screen to scavenge values, 74 Set points are selected (bulk sensor setting and screen size) to maximize the waste rejection at a grade below economic CoG, 76 Is the available tonnage>processing capacity?, 78 Yes, 80 No, 82 Second stage bulk sort (and/or screen), 84 Classification and CPF, 86 Conventional flotation, 88 Low grade stockpile, 90 Is throughput further constrained e.g. water/tailing?, 92 Yes, 94 No, 96 Classification to recover oversize, 98 Set points are selected for classification sizes to maximise grade and tonnage to conventional flotation whilst maintaining high overall processing recovery.

Figure 5:
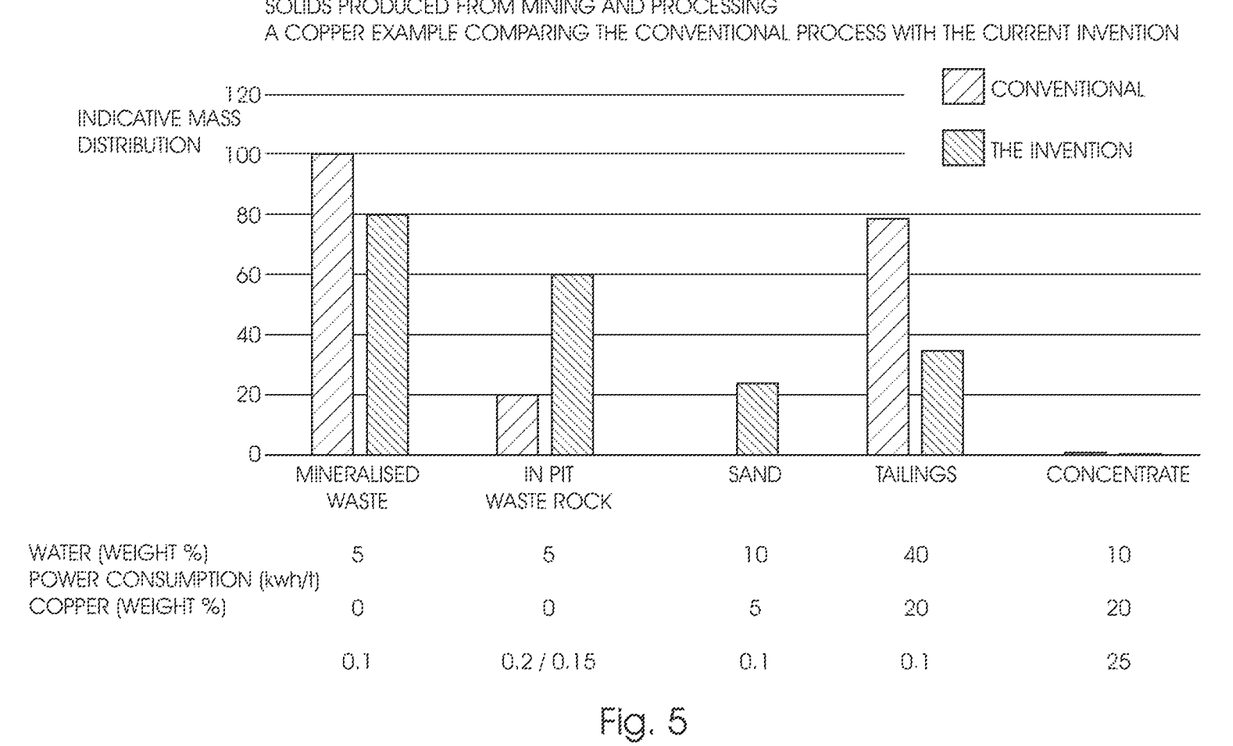
FIG. 5 is a graph illustrating the potential impact of the process of the present invention on power consumption, water consumption, and tailings generation in comparison with a conventional crushing, grinding and flotation process.

The exact distribution of beneficiation steps and their set-points for every orebody and every optimised business case will be different. As an example, FIG. 5 illustrates the potential impact on power consumption, water consumption, and tailings generation in an alternative configuration of the invention which is directed to increasing mine life, whilst continuing to save water and energy and increase production. Through the invention, a proportion of what would be permanently discarded in-pit and expanded pit mineralised waste in a conventional mine, is now converted to ore (i.e. above the economic CoG). The expanded source of ore is sorted and screened to reject a substantive fraction of the ore as a waste ('in pit waste rock' which is below the economic processing CoG). CPF rejects further waste as dry stacked sand, thus the quantity of ore progressing to fine comminution for conventional flotation is considerably reduced. Since most of the energy and water consumption is attributable to the requisite amount of fine grinding required for conventional flotation (illustrated by the height of the tailings bar), the water and energy consumption per unit of product is more than halved, and the life of the resource is extended.

In summary, by combining the three beneficiation processes, each of which relies on a different form of ore heterogeneity; the invention achieves a greater recovery of the values in an orebody through reducing the processing cut-off-grade, and enables more of the gangue to be discarded in dry form, and the potential for a low grade ore to be stockpiled prior to fine grinding later in the mine life. This in turn reduces the water consumption and comminution energy, and reduces the amount of tailings generation to a modest proportion of the original ore. The resultant operating costs are reduced, and capital productivity of the processing facilities is much enhanced.

Advantages of the process of the present invention are:
Requirements for grade control activities in pit are minimised, enabling simpler mining.
The grade of ore to grinding may be increased by more than 10%, and more preferably by 20% and most preferably by more than 30%.
The ultimate economic cut-off-grade for mining of an orebody may be reduced by more than 10% and preferably by more than 20%, and more preferably by more than 30%.
The total amount of fine tailings produced from the conventional run-of-mine ore may be reduced to less than 50% of those resulting from conventional processing technology, and preferably less than 40%, and even more preferably less than 30%.
The total amount of energy used in comminution may be reduced to less than 50% of that resulting from conventional processing, and preferably less than 40%, and even more preferably less than 30%.
The total amount of water consumed in tailings may be reduced to less than 50% of those resulting from conventional processing, and preferably less than 40%, and even more preferably less than 30%.

The invention claimed is:

1. An integrated process for recovering value metals from sulphide ore, including the steps of:
   a) obtaining a crushed ore;
   b) bulk sorting and screening the crushed ore to provide a sorted/screened coarse ore stream and a waste ore stream;
   c) subjecting the sorted/screened coarse ore stream to grinding in a mill followed by classification to provide a coarse fraction suitable for coarse flotation and a first fine fraction suitable for conventional flotation;
   d) subjecting the coarse fraction suitable for coarse flotation to coarse flotation thereby to obtain a gangue and an intermediate concentrate;
   e) subjecting the intermediate concentrate to grinding to provide a second fine fraction suitable for flotation; and
   f) subjecting the first fine fraction and the second fine fraction to conventional flotation to provide a concentrate and tailings.

2. The process claimed in claim 1, wherein, at step a), the ore is crushed to a size suitable for presentation on a conveyor, as a feed to grinding stage at step c).

3. The process claimed in claim 2, wherein, at step a), the ore is crushed to a size in the range of 5 to 40 cm.

4. The process claimed in claim 1, wherein bulk sorting in step b) is on a bulk sorter comprising a conveyor belt with a diverter mechanism controlled by a continuous analysis sensor, wherein the diverter mechanism diverts low grade zones of rock which do not meet a selected cut off grade (CoG) to the waste stream.

5. The process claimed in claim 4, wherein the continuous analysis sensor comprises a rapid scanning sensor.

6. The process claimed in claim 5, wherein the sensor is a magnetic resonance or neutron activation or an X-ray sensor.

7. The process claimed in claim 4, wherein the cut off grade (CoG) is determined from geo-statistical analysis of drill core from the source of the ore.

8. The process claimed in claim 1, wherein, at step b), the crushed ore is subjected to screening or screening followed by bulk sorting.

9. The process claimed in claim 1, wherein, at step b), the crushed ore is subjected to bulk sorting to provide a sorted coarse ore stream, which is subjected in to grinding in step c), and a first waste ore stream.

10. The process claimed in claim 9, wherein the sorted coarse ore stream is screened to provide a screened coarse ore stream, which is subjected to grinding in step c), and a second waste ore stream.

11. The process claimed in claim 10, wherein the size of screen apertures of a screen used to screen the coarse ore stream are selected to provide a screened coarse ore stream that is about 80-90% by weight of the coarse ore stream from bulk sorting.

12. The process claimed in claim 10, wherein, at step b), the first waste stream is screened to provide a third waste ore stream and a higher grade fraction that is sent for grinding in the grinder at step c) together with the sorted/screened ore stream.

13. The process claimed in claim 12, wherein the size of screen apertures of a screen used to screen the first waste ore stream are selected to recover from 15-25% by weight of the stream.

14. The process claimed in claim 1, wherein, at step c), the ore is ground and classified to separate a size of less than 1000 micron.

15. The process claimed in claim 1, wherein, at step c), the ore is subjected to classification to provide a coarse fraction suitable for coarse flotation and a first fine fraction suitable for conventional flotation.

16. The process claimed in claim 15, wherein, at step c), the ore is subjected to classification to provide a coarse fraction suitable for coarse flotation with a size range of 100 μm up to 1000 μm, and a first fine fraction suitable for conventional flotation with a size of less than 100 μm.

17. The process claimed in claim 16, wherein, at step c), the ore is subjected to classification to provide a coarse fraction suitable for coarse flotation with a size range of 150 μm up to 1000 μm, and a first fine fraction suitable for conventional flotation with a size of less than 150 μm.

18. The process claimed in claim 17, wherein, at step c), the ore is subjected to classification to provide a coarse fraction suitable for coarse flotation with a size range of 200 μm up to 1000 μm, and a first fine fraction suitable for conventional flotation with a size of less than 200 μm.

19. The process claimed in claim 1, wherein, at step e), the intermediate concentrate is ground a size of less than 150 μm to provide a second fine fraction suitable for conventional flotation.

20. The process claimed in claim 1, in which natural grade recovery curves are determined for the ore, and each of the following beneficiation steps:
   iv) bulk sorting;
   v) screening;
   vi) coarse flotation;
   is arranged and controlled to permanently reject the maximum quantity of waste at a grade less than an economic cut-off-grade.

21. The process claimed in claim 20, in which the beneficiation steps
   iv) bulk sorting;
   v) screening;
   vi) coarse flotation;
   are further arranged and controlled to also separate a low grade ore suitable for stockpiling or heap leaching, and hence produce a high grade feed to fill the available comminution and conventional flotation capacity.

* * * * *